Inventors:
Daniel C. Stahly
George H. Schaefer
William F. Beck

By George R. Clark
Atty

Inventors:
Daniel C. Stahly
George H. Schaefer
William P. Beck
By George R Clark, Atty

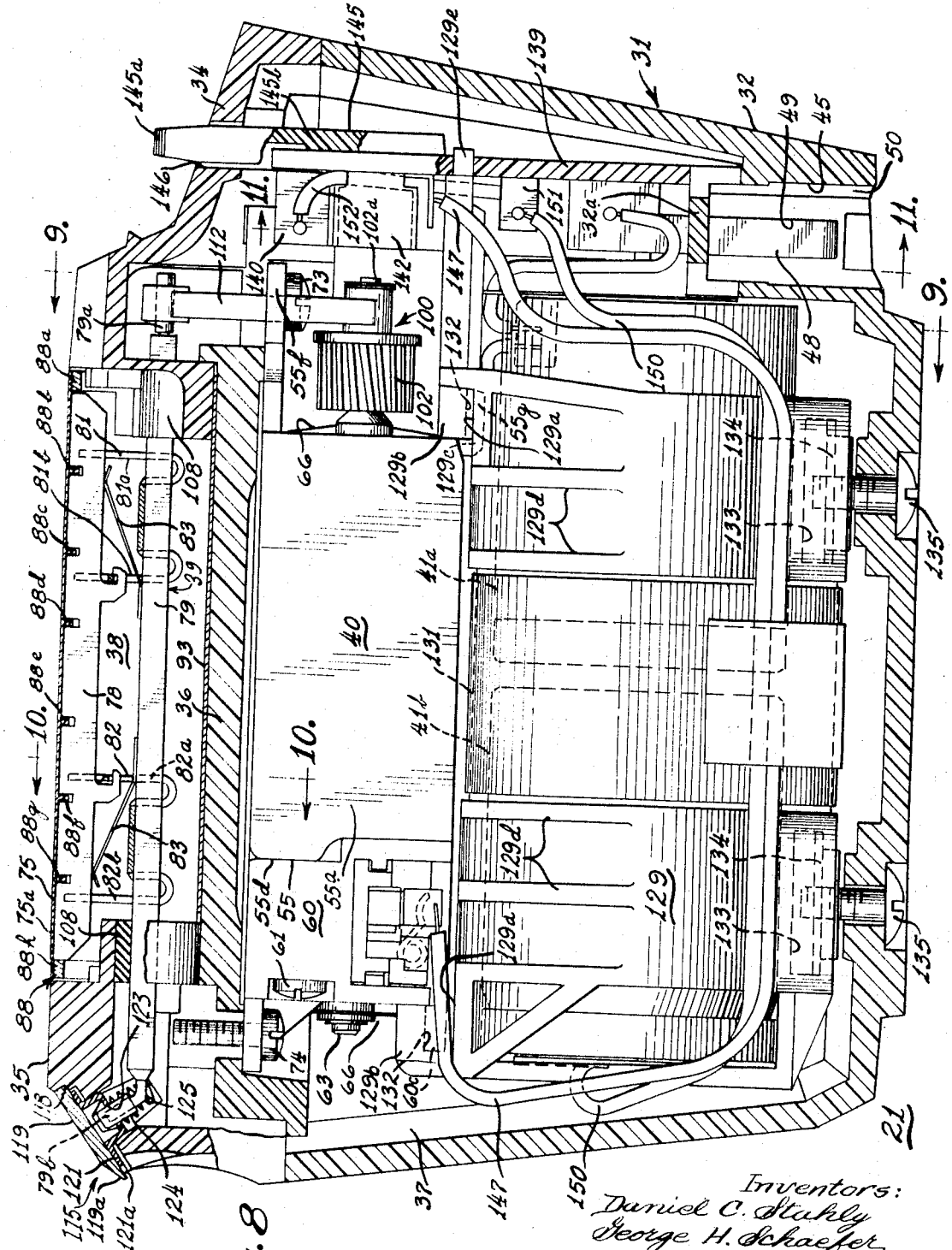

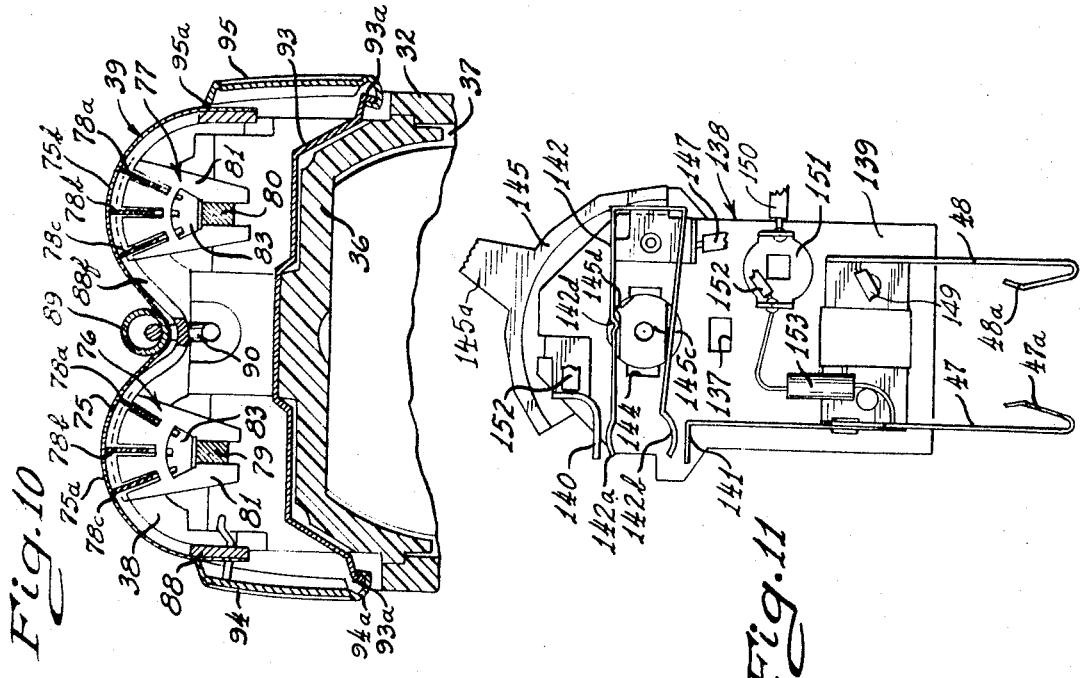

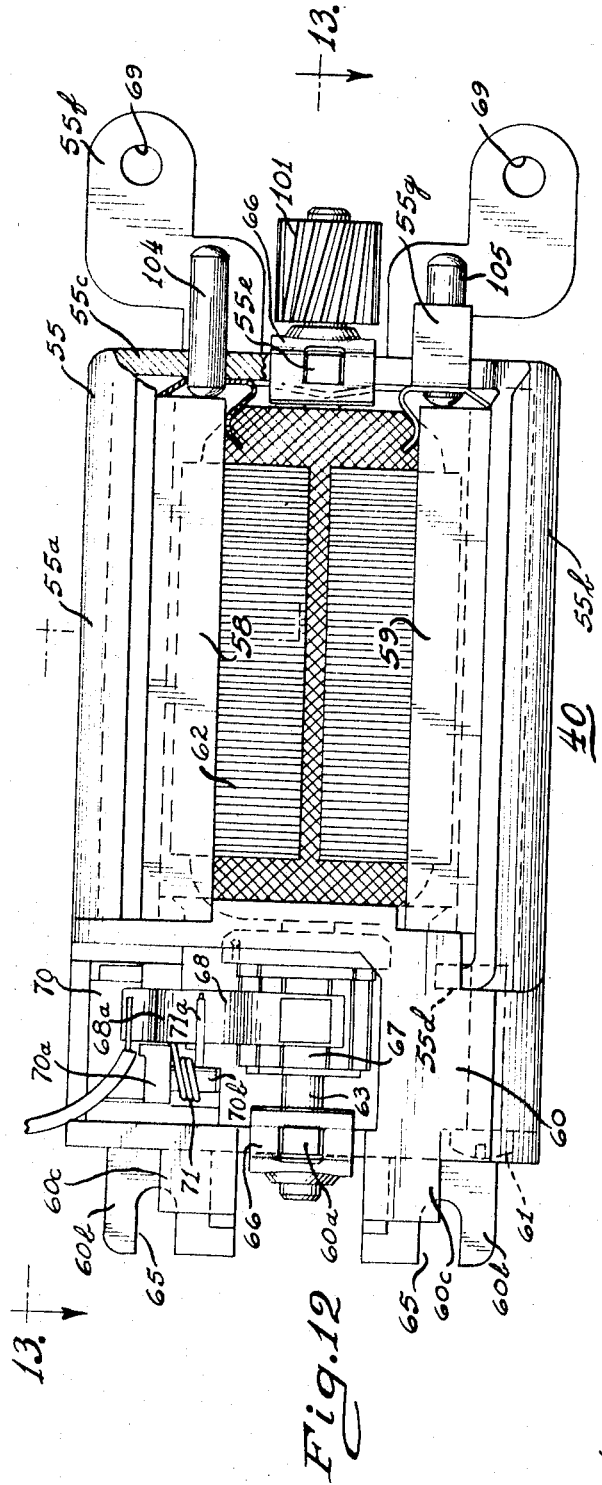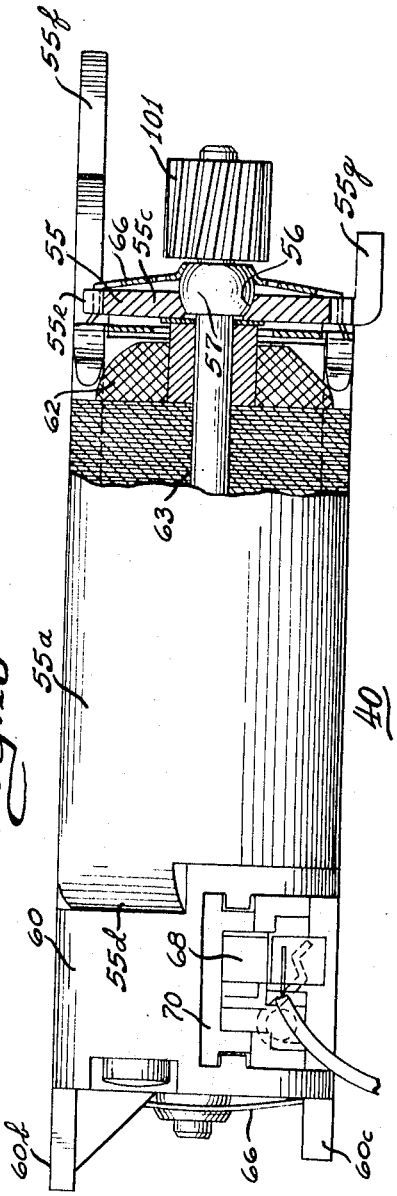

United States Patent Office 3,447,058
Patented May 27, 1969

3,447,058
RECHARGEABLE BATTERY OPERATED APPLIANCE
Daniel C. Stahly, Villa Park, George H. Schaefer, River Forest, and William P. Beck, Westchester, Ill., assignors to Sunbeam Corporation, Chicago, Ill., a corporation of Illinois
Filed May 27, 1966, Ser. No. 553,510
Int. Cl. H02j 7/02
U.S. Cl. 320—2                 9 Claims

ABSTRACT OF THE DISCLOSURE

A cordless electric shaver is provided with a support having a recess. When the shaver is stored in the recess, charging terminals on the support contact terminals on the shaver so that a battery in the shaver is charged from a charging unit in the support. A cord connected to the output of the charging unit in common with the charging terminals can be connected to the shaver terminals for operation of the shaver directly from the power supply. The shaver includes a switch arranged so that the shaver may be charged, operated by battery or operated from the cord with only two terminals.

---

This application relates to an electric appliance and, more particularly, to an electrically operated shaver and to such appliances and shavers wherein the power source is a rechargeable battery and commonly referred to as a cordless electric shaver.

Electric shavers of several different types are extensively employed by many persons as the sole means of shaving. One such type of electric shaver which is commercially available is that disclosed and claimed in Jepson et al. Patent No. 3,196,539, granted July 27, 1965, and assigned to the same assignee as the present application. It has been stated that electric shavers have become a necessity for many people rather than a luxury.

Since people are beginning to travel a great deal, the electric shaver generally accompanies the owner in travels throughout the world. It is a well-known fact that the sources of electricity throughout the world vary, both as to voltage, frequency and the particular type of electrical connections, and the conventional electric shaver which is plugged into a wall outlet is not adapted for universal use. Moreover, it is necessary that an electric shaver be designed so that it may be held comfortably and conveniently in the hand of the operator. Proof of this desirability is evident by the fact that nearly all major electric shavers sold on the market today are essentially of the same shape and configuration as the shaver shown in Jepson Patent No. 2,688,184, granted Sept. 7, 1954, and assigned to the same assignee as the instant application.

It has heretofore been proposed that an electric shaver be provided which is suitable for operation from rechargeable batteries so that theshaver may readily accompany the user in travels throughout the world. One such electric shaver is that designed primarily for women and claimed and disclosed in the copending application of Jepson et al. Ser. No. 423,464, filed Jan. 5, 1965, and assigned to the same assignee as the instant application. Electric shavers designed primarily for men which are of the rechargeable battery type have heretofore been proposed which contain a battery recharging assembly within the casing of the shaver. Such cordless electric shavers have been criticized for being somewhat larger and more bulky, and consequently less convenient to handle and use.

Accordingly, it is an object of the present invention to provide a new and improved shaver which has the desirable features set forth above.

It is another object of the present invention to provide an improved dry shaver powered by a rotary commutator type electric motor which is provided with an improved cutting head.

It is a further object of the present invention to provide a battery operated electric dry shaver for men which may be utilized over long periods of time without recharging the battery and which has the same compact size in spite of the provision of the battery which has come to characterize the desirable size and design of many present shavers.

It is another object of the present invention to provide a battery operated electric dry shaver for men which includes self-contained batteries adapted to be periodically recharged by suitable charging means but which may also be operated directly from a source of alternating current power.

A further object of the present invention is to provide a battery operated electric shaver which may be set on a suitable support when not in use and which will have its batteries automatically recharged by the mere placing of the shaver onto the support.

Yet another object of the present invention is to provide a new and improved support for an electric shaver having a charging unit built into the support so as to provide a cordless electric shaver of minimum size and of a desirable design.

Still another object of the present invention is the provision of a new and improved battery operated electric shaver having an improved switch for connecting the motor selectively to the battery or to the output of a charging or rectifier assembly.

Yet a further object of the present invention is to provide a new and improved electric shaver having a power unit readily receivable within a casing and readily removable therefrom to provide for convenience of servicing and maintenance.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 8 is an enlarged sectional view of the shaving unit of the electric shaving apparatus, taken substantially along line 8—8 of FIG. 1, but without cutting through the motor, battery or battery support;

FIG. 9 is a sectional view taken along line 9—9 of FIG. 8, assuming that FIG. 8 shows the complete structure, and with certain portions broken away more clearly to illustrate the present invention;

FIG. 10 is a fragmentary sectional view of the cutting head assembly of the shaving unit, taken along line 10—10 of FIG. 8, again assuming that FIG. 8 shows the complete structure;

FIG. 11 is a fragmentary sectional view of the shaving unit, taken along line 11—11 of FIG. 8, again assuming FIG. 8 shows the complete structure, but illustrating primarily the control switch and associated parts;

FIG. 12 is a bottom view of the motor assembly of the shaving unit of FIG. 8 with certain portions cut away;

FIG. 13 is a partial sectional view taken along line 13—13 of FIG. 12; and

Figure 1:
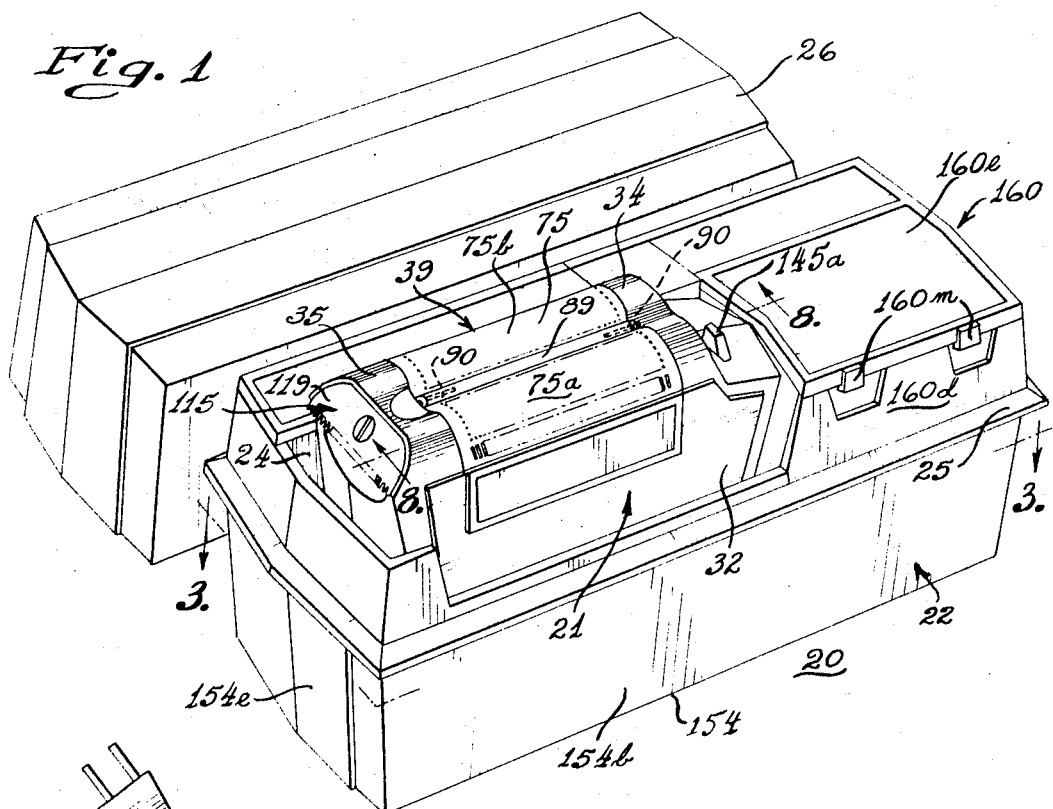
FIG. 1 is a perspective view of an electric shaving apparatus according to the present invention and illustrated with its cover disposed to one side of the apparatus.

Briefly the present invention is concerned with a shaving apparatus including a so-called cordless or battery operated electric shaver or shaving unit which is small and compact and of a design conforming to the hand of the user. The shaver is stored in a charging unit provided with a recess defining a support for the shaver and which charging unit includes the means for charging the battery of the shaver. Terminals in the recess are connected to the low voltage direct current output of the charging unit or assembly. Moreover, the shaver is provided with cooperating terminal means so that the charging unit is operatively connected to the shaver by the mere placing of the shaver into the recess provided therefor.

In accordance with another aspect of the present invention there is provided an improved electric shaver of the type provided with a rotary motor and having a cutting assembly including a pair of oscillating blade supporting means each carrying a plurality of cutter blades. A dual comb is defined by joining two arcuate perforated sections so that the cutter blades oscillate across the inner surface of the comb. The motor shaft is provided with a gear drivingly engaged with two oppositely rotating driving gears. Each of the driving gears is provided with an eccentric projection defining a crank. Connecting rods operatively connect a respective crank with a respective one of the oscillating blade supporting members to provide the drive for the cutter assembly. To provide for trimming longer hairs, there is provided a trimming cutter including a trimming blade. The trimming blade is driven by an extension from one of the oscillating cutter members. Preferably the power unit of the shaver including the batteries, motor and cutting head assembly are preassembled and the motor and batteries inserted as a unit into the casing, thereby facilitating maintenance and repair. The power unit is held assembled with the casing solely by a pair of fasteners extending through the bottom of the casing.

In accordance with still another aspect of the present invention there is provided an improved switch which is effective, when in its "ON" position, to connect the shaver motor both across the battery and across the terminal means of the shaver so that the shaver motor may be operated directly from the batteries or through a power cord extending from the charging assembly. Moreover, when the switch is in the "OFF" positon, the switch is effective to connect the batteries to the terminal means so that the batteries may be charged directly through the terminal means from the charging unit or assembly.

Referring now to the drawings, the present invention is directed to a shaving apparatus generally designated as 20, including an electric shaving unit 21 supported when not in use of a charging unit 22. The charging unit 22 is effectively also a base or support for the shaving unit 21. As will become apparent from the ensuing description, the shaver 21 includes a self-contained battery operated electric power unit enclosed in a suitable casing and adapted to be comfortably held in the hand of the user and which will perform the shaving operation without the necessity of connecting the same to a source of electric current. The base or charging unit 22 is designed to hold the shaver 21 when not in use and to automatically connect the shaver 21 to a charging circuit 23 (FIGS. 3 and 6) so that the battery or batteries of the shaver 21 are automatically charged when the shaver is not in use. To this end the base or charging unit 22 is provided with a recess 24 (FIGS. 1, 2, 3 and 4) for receiving the shaver 21. The base or charging unit 22 is also provided with a laterally projecting flange defining shoulder 25 for engaging the lower edge of a cover 26 for closing the upper part of the charging unit 22 and enclosing the shaver 21 when in its recess 24. The base 22 and cover 26 provide an ornamental assembly which will not be unattractive when employed in a bathroom or bedroom.

Considering now the shaver or shaving unit 21 in more detail, it comprises a casing 31 defined by a generally cup-shaped casing member 32 and a pair of end caps 34 and 35, all preferably molded from a suitable plastic. For supporting the motor and cutter described hereinafter, there is provided a support member 36 which effectively closes the open top of the cup-shaped casing member 32 to divide the casing 31 into a motor and battery chamber below support 36, generally designated as 37, and a cutter chamber above support 36 and between end caps 34 and 35, generally designated as 38. Disposed within the cutter chamber 38 is a cutting head assembly (FIGS. 8 and 10) generally designated as 39. Disposed within the motor and battery chamber 37 is a rotary electric motor 40 secured to the underside of support member 36 (FIGS. 8, 9 and 10). Also disposed within the motor and battery chamber and supported from the motor in a manner described hereinafter are a pair of rechargeable batteries 41a and 41b arranged in end-to-end relationship and connected in series selectively to energize the electric motor 40. These rechargeable batteries 41a and 41b are collectively referred to as 41.

In order that a power connection can be made to the shaver 21 for charging the batteries 41a and 41b or alternatively to energize the motor 40, the casing member 32 is provided with a bottom opening recess 45 at its one end defining a receptacle for receiving a power connection. More specifically, the recess 45 has its inner end partially closed by a shelf or casing portion 32a (FIG. 8) integrally formed with the casing 32 and provided with suitable openings through which extend a pair of terminal members 47 and 48 (FIG. 11). The terminal members 47 and 48 are provided with reversely bent contact portions 47a and 48a, respectively, for engaging cooperating contacts described hereinafter. The terminal members 47 and 48 are in suitable depressions 49 formed in casing 32 along the sides of the recess 45. A keyway 50 extending longitudinally in the recess 45 permits polarization of the terminals with a cooperating direct current supply.

Considering now in more detail the motor 40, it preferably is of the rotating type and is illustrated (FIGS. 8, 12 and 13) as having a U-shaped stator support member 55. The legs of this support, designated as 55a and 55b, are of somewhat arcuate configuration (FIG. 9) for supporting a pair of opposed permanent magnet pole pieces 58 and 59 of an arcuate configuration so as to define a rotor chamber therebetween. The bight portion 55c of the U-shaped stator support member 55 effectively defines a crank end bearing block and is provided with an opening 56, the edges of which have a somewhat spherical configuration (FIG. 13) to accommodate a spherical crank end bearing 57. A commutator end bearing block 60 is fastened by fastening means 61 to the lateral projections 55d (FIGS. 8, 12 and 13) at the free ends of the legs 55a and 55b. As illustrated, the lateral projection 55d from leg 55a is adjacent the top of the motor, while lateral projection 55d from leg 55b is near the bottom of the motor. The bearing block 60 is designed to support a suitable bearing like the spherical bearing 57 and also to support suitable brush supports for a commutator described hereinafter. Preferably the stator support member 55 is formed of suitable sheet material, while the bearing block 60 may be formed by die casting or other suitable means.

Disposed within the rotor chamber described above is an armature 62 supported on a shaft 63 suitably journaled in the self-aligning bearings such as 57 described above. The bearings such as 57 are held in place against the end bearing blocks 55c and 60, respectively, by suitable bearing retainers in the form of spring clips 66. These spring clips are adapted to engage integral projections such as 55e in the case of bearing block 55c or 60a in the case of bearing block 60. It will be appreciated that at least the shaft engaging portions of the self-aligning bearings such as 57 are formed of a material which provides what is commonly referred to as an oilless bearing.

The motor 40 is illustrated as a low voltage direct current commutator type motor and, consequently, associated with the armature 62 is a commutator 67 (FIG. 12), the latter being supported on the motor shaft 63 and effectively housed within the commutator end bearing block 60. Supported in diametrically opposed relation in the commutator and bearing block 60 are a pair of identical brush holders 68 supported from suitable insulating blocks 70 of plastic or other electrically insulating material, the blocks 70 being keyed or otherwise secured to the bearing block 60. As best illustrated in FIG. 13, each of the brush holders 68 is formed of a strip of electrically conducting material pivoted at 68a on an upstanding shelf 70a of the insulating blocks 70. A torsion spring 71 wound about a projection 70b of the insulating block 70 and having one end 71a bearing against the brush holder 68 biases the brush holder 68 toward the commutator 67. A suitable brush 72 (not shown except in FIG. 7) is secured as by soldering to the end of each brush holder 68 to provide the electrical contact with the commutator 67. It will be understood that if end bearing block 60 were molded from a suitable plastice then insulating blocks 70 could be omitted.

To provide for assembling the motor 40 with the other components of the electric shaver 21, the support 55 is provided at the upper edge of bight portion 55c with a first pair of integral projections 55f, each provided with a screw opening or recess 69 and with a second set of integral projections 55g extending from the lower edge of bight portion 55c. Moreover, the other bearing block 60 is also provided at its upper edge with a first pair of integral projections 60b, each provided with a screw opening or slot 65. Also, at its lower edge the bearing block 60 is provided with an additional pair of projections or tabs 60c. In order to secure motor 40 and end caps 34 and 35 to support member 36, suitable pairs of screws 73 and 74 (FIGS. 8 and 9) pass through the openings 69 and 65 in projections 55f and 60b, respectively, to engage threaded openings in end caps 34 and 35. In this way the end caps 34 and 35, support member 36 and motor 40 become a subassembly.

Referring now to the cutting head assembly 39 as best illustrated in FIGS. 8 and 10, it includes a comb 75 defining a cutting surface. Comb 75 comprises a pair of joined arcuate perforated sections 75a and 75b cooperating wtih a pair of substantially identical oscillating blade assemblies 76 and 77. The oscillating blade assemblies 76 and 77 are adapted to be oscillated through suitable during means by the motor 40 at a suitable speed which may be in excess of 8000 cycles per minute. Each of the blade assemblies 76 and 77 includes a plurality of cutters or cutter blades 78, individually referred to as 78a, 78b and 78c.

For the purpose of supporting the cutter blades 78 for oscillation, there are provided a pair of oscillating cutter shafts 79 and 80, each carrying a pair of U-shaped supports 81 and 82, respectively, best shown in FIGS. 8 and 10. The bight portions of the supports 81 and 82 are provided with portions to receive and be secured to the respective shafts 79 and 80, while the legs thereof extend upwardly to define slotted blade support portions 81a, 81b, 82a and 82b in a manner well understood in the art, the blades 78 being receivable in aligned slots in support portions 81a, 81b, 82a and 82b. The cutter blades 78 are effectively identical and may be similar to those more fully described in the above-mentioned Jepson et al. Patent No. 3,196,539.

Figure 14:
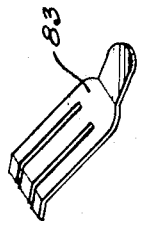
FIG. 14 is a perspective view of a blade spring employed with the shaver of FIG. 1.

For the purpose of biasing the cutter blades 78 into shearing engagement with the comb 75, there is provided for each U-shaped support 81 and 82 a tined spring member 83 (FIGS. 8, 10 and 14). As illustrated, each spring member is shaped like a short-handled three-tined fork having the short handle portion thereof secured to the respective shaft 79 or 80 and with the three tines or spring fingers each extending into the path of a different one of the blades 78 and consequently biasing the blades upwardly against the comb 75. It is understood that the centrifugal force produced as a result of high speed oscillation of the cutter blades 78 will cause the cutter blades to be forced against the inside surface of the comb 75 insuring engagement therewith in accordance with the principle set forth in Patent No. 2,081,694. This centrifugal force is, of course, combined with the force of the spring members 83.

As best illustrated in FIGS. 1, 8 and 10 of the drawings, the comb 75 comprises a cutting surface formed of very thin flexible material having a large number of hair receiving openings. Since the cutting surface of the comb 75 is formed of relatively thin material, it tends to conform itself to the shape of the surface with which it is in contact and, therefore, must be supported by a suitable supporting structure or frame, generally designated at 88, comprising a plurality of parallel, double arcuate ribs 88a, 88b, etc. (FIG. 8) and spaced from one another in a diretcion running along the longitudinal axis of the cutting blades 78. The ribs 88a and 88h are effectively end frame members and are somewhat wider and stronger than the remaining ribs. The cutting surface portion of the comb 75 is suitably fastened at its outside edges to the supporting frame 88 as by riveting. If desired, it may be removably secured as by any suitable means. Moreover, in order to have the cutting surface follow the double arcuate contour of supporting frame 88 with a central depressed portion (FIG. 10), there is provided a tubular comb tightener 89 (FIG. 10) which is held in place by U-shaped retaining clips 90, one engageable with each end of tubular member 89 (FIGS. 1 and 10). This comb tightener is disclosed and claimed in copending Bauer application Ser. No. 553,575, filed May 27, 1966, and assigned to the same assignee as the present application.

For retaining the comb 75 in shearing relationship to the rest of the cutting head assembly 39, there is provided a comb lock spring 93 (FIGS. 8 and 10) clamped in place between the end caps 34 and 35 and the support member 36. As illustrated, comb lock spring 93 terminates in downwardly extending pivot flanges 93a. A movable comb hinge plate 94 has one edge releasably secured to one lower edge of the comb supporting frame 88. Moreover, hinge plate 94 is hook-shaped as indicated at 94a on its other edge (FIG. 10) so as to make pivotal engagement with one of the downwardly depending flanges 93a of the comb lock spring 93. A comb latch plate 95 on the opposite side of the comb 75 from the hinge plate 94 is pivotally related to the other pivot flange 93a on comb lock spring 93. Latch plate 95 is further provided with two spaced latch member (not shown) extending through suitable latch opening in the comb supporting frame 88 thereby to latch the comb 75 in place as part of the cutting head assembly 30. The comb hinge plate 94 and comb latch plate 95 preferably are similar to those more fully described in the prior mentioned Jepson et al. Patent No. 3,196,539.

For the purpose of converting rotary motion of the motor shaft 63 to oscillating motion of the cutter shafts 79 and 80, there is provided a suitable driving means 100 (FIGS. 8 and 9) which includes a pinion 101 mounted on the end of the motor shaft 63 and drivingly engaging with a pair of opposed driving gears 102 and 103 rotating on stud shafts 104 and 105 (FIG. 12) supported in spaced parallel relationship from bearing block 55c. Gears 102 and 103 are provided with an eccentrically disposed projection 102a and 103a, respectively, effectively defining a pair of cranks.

To support the cutter shafts 79 and 80 for oscillation, each shaft is provided adjacent each end thereof with suitable resilient mounting blocks 108 preferably bonded to the associated shaft which may be of the type more fully described in a copending Jepson application Ser. No. 410,115, filed Nov. 10, 1964, now Patent No. 3,244,913 granted Apr. 5, 1966 and assigned to the same assignee as the present application. As in such copending application, the mounting blocks 108 are clamped securely into position between support member 36 and end caps 34 and 35, suitable recesses for such mounting blocks being provided. As illustrated, the shafts 79 and 80 are each provided with integral crank portions 79a and 80a, respectively. A pair of connecting rods 112 and 113 each operatively connects the crank 102a or 103a defined on the driving gears with a respective one of the cranks 79a or 80a defined on the cutter shafts. In this manner the rotating motor 40 causes oscillation of the blade assemblies 76 and 77.

For cutting longer hair such as trimming a mustache, sideburns and the like, one of the end caps 35 carries a trimming cutter assembly 115 which may be very similar to that disclosed in copending Schuessler application Ser. No. 375,787, filed June 17, 1964, now Patent No. 3,290,774 granted Dec. 13, 1966, and assigned to the same assignee as the instant application. To this end the end cap 35 is provided with an angled surface defining a shelf 118 supporting a trimming comb 119. The trimming comb 119 is provided with suitable projections or teeth 119a for receiving comparatively long hairs. A cooperating trimming cutter 121 is positioned against the inner surface of the trimming comb 119 and is provided with cutting teeth 121a making shearing engagement with the teeth 119a. The trimming cutter is reciprocal relative to the trimming comb and is readily driven by the motor 40 through the provision of an angularly extending integral projection 79b defined on the end of the cutter shaft 79 remote from the crank end and engageable within a recess or opening 123 in the trimming cutter 121. A sheath 124 of nylon or other suitable material on the end of the projection 79b minimizes noise and provides a smooth drive to the trimming cutter 121. A plurality of coil springs 125 positioned in suitable recesses in the shelf 118 bias the trimming cutter 121 into cutting engagement with the trimming comb 119. If desired, the end of the coil springs 125 may be fixed relative to the trimming cutter 121 by providing suitable detents in the trimming cutter 121 receiving the ends of the coil springs 125.

To support the batteries 41a and 41b within battery and motor chamber 37, there is provided a battery carrier 129 (FIGS. 8 and 9) preferably formed of a molded nylon or other suitable material. The battery carrier 129 has a generally semicircular inner surface 130 against which the tubular batteries 41 are received in end-to-end relationship. Suitable tape means 131 or other binding material is used to hold the batteries assembled with the battery carrier 129.

In order to assemble the battery carrier 129 with the motor 40, the upper end of the former is provided adjacent each end with a generally flat shelf portion 129a terminating in an L-shaped flange 129b (FIGS. 8 and 9) thereby defining opposed channels 132 adjacent the ends of carrier 129. These channels are disigned to slidably receive the tabs 55g and 60c of the end bearing blocks 55c and 60 of the motor 40 thereby to unite the motor 40 and batteries into a subassembly. The channels 132 are closed at one end thereof by integral wall portions 129c. The carrier is provided at its intermediate portions with projecting ribs 129d, the upper edges of which engage the underside of motor 40. Moreover, the lower end of the battery carrier 129 is provided with a pair of grooved recesses 133, each receiving a sheet metal nut 134. A pair of screws 135 extend through the bottom of the casing member 32 for engagement with the sheet metal nuts 134 to lock the entire power unit and cutting head subassembly of the shaver into place relative to the casing member 32.

For the purpose of permitting the user to energize the shaver 21 selectively directly from the batteries 41a and 41b or directly from a power source through the charging unit 22, there is provided a double-pole single-throw switch unit 138, best shown in FIG. 11. The switch unit 138 includes an insulating support board 139 having an opening 137 therein for receiving the end of a cooperating integral projection 129e from battery carrier 129, whereby the switch unit is supported as part of the subassembly. Mounted on the insulating board 139 are a pair of stationary switch contacts 140 and 141 and a generally U-shaped switch member 142, the ends of the legs 142a and 142b thereof functioning as movable switch contacts. As illustrated, the stationary contacts 140 and 141 and the U-shaped switch member 142 are secured to the support board 139 so that separation of the legs of the U-shaped switch member will cause the movable contact 142a to engage stationary contact 140 and will cause the movable contact 142b to engage stationary contact 141. The legs of the U-shaped switch member are resilient and are inherently biased to the open switch position. With this arrangement, spreading of the switch leaves is effective to close the pairs of switch contacts 142a–140 and 142b–141.

In order to actuate the switch 138, there is provided a manually operated rotary switch actuator 145 (FIGS. 8 and 11) having a knob portion 145a extending through an opening 146 defined in the end cap 34 so as to be readily actuatable by the user. This actuator 145 includes an integral projecting shaft portion 145b which extends through a suitable opening 144 in board 139 disposed between the legs of switch member 142. The end of shaft portion 145b terminates in a double-lobed cam 145c disposed between the legs of the switch member 142 so as to be effective to spread the legs outwardly relative to each other in response to relative rotation of shaft portion 145b. The switch actuator 145 is disposed on one side of the board 139, while the cam 145c and contacts described above are on the other side.

To hold the switch 138 in its "ON" position against the inherent resilience of the legs of switch member 142, one of the switch leaves is provided with a detent 142d and the switch actuator 145 is provided with a cooperating detent 145d so that when the switch actuator 145 is rotated to the "ON" position the detents 142d and 145d interlock to latch the switch actuator in the switch closed position. To insure good electrical contact between the switch contacts 142a and 142b with their corresponding stationary contacts 140 and 141, each of the contacts 142a and 142b is split longitudinally from the end to define a pair of spring contact fingers thus insuring good electrical contact with cooperating contacts 140 or 141 even though some misalignment or irregularities may occur during the manufacturing or assembly process of the switch 138.

The terminal members 47 and 48 described above are secured to the board 39 so as to be part of the subassembly of motor, batteries, switch and cutting mechanism.

Figure 7:
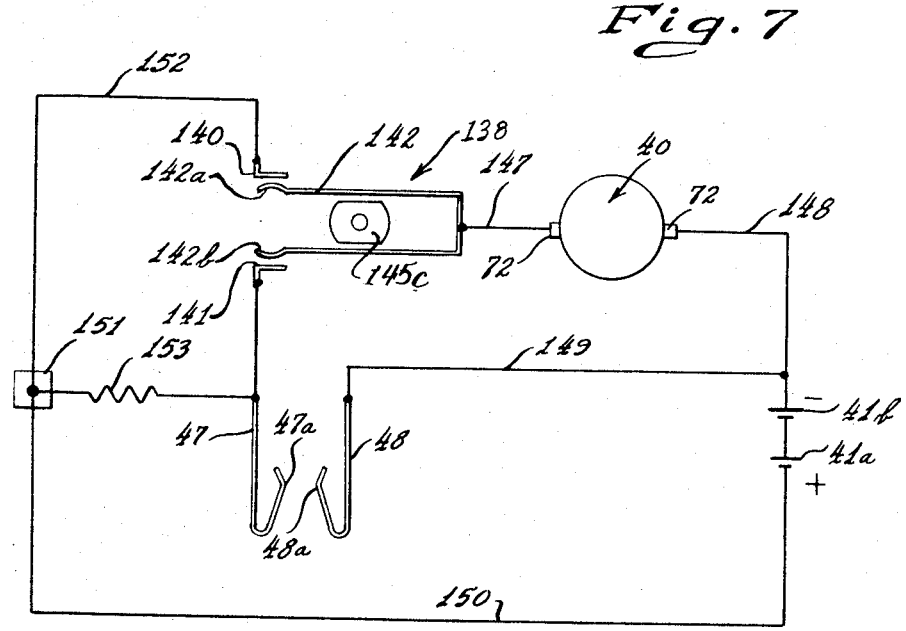
FIG. 7 is a schematic diagram of the electrical circuit of the shaving unit.

The electrical circuit of the shaving unit 21 is illustrated schematically in FIG. 7 of the drawings with the corresponding parts designated by the same reference numerals as in the other figures. As illustrated, one terminal of motor 40 is connected to the switch member 142 by a conductor 147 while the other motor terminal is connected to the negative battery terminal by a conductor 148. This negative battery terminal is also connected to the terminal 48 through a conductor 149. The positive terminal of battery 41a, which battery is connected in series with battery 41b, is connected through a conductor 150 to a terminal support 151 secured to board 139 (FIGS. 7, 8 and 11). Terminal support 151 is connected to stationary contact 140 through a conductor 152 or, in other words, contact 140 is connected to the positive battery terminal. As further illustrated, contact 141 and terminal 47 are alseo interconnected and might even be an integral element comprising both contact 141 and terminal 47. In order to limit the charging current, a current limiting resistor 153 is connected between contact 141 and terminal support 151 so as to be in series with the circuit connecting batteries 41a and 41b across the terminals 47 and 48. When the switch 138 is closed, the electric motor 40 is connected across the serially connected batteries 41a and 41b and is also connected across the terminals 47 and 48, so that the motor may be energized from the batteries or, if desired, should the batteries be discharged, from an outside source of low voltage direct current energy of the proper polarity supplied to terminals 47 and 48.

Figure 2:
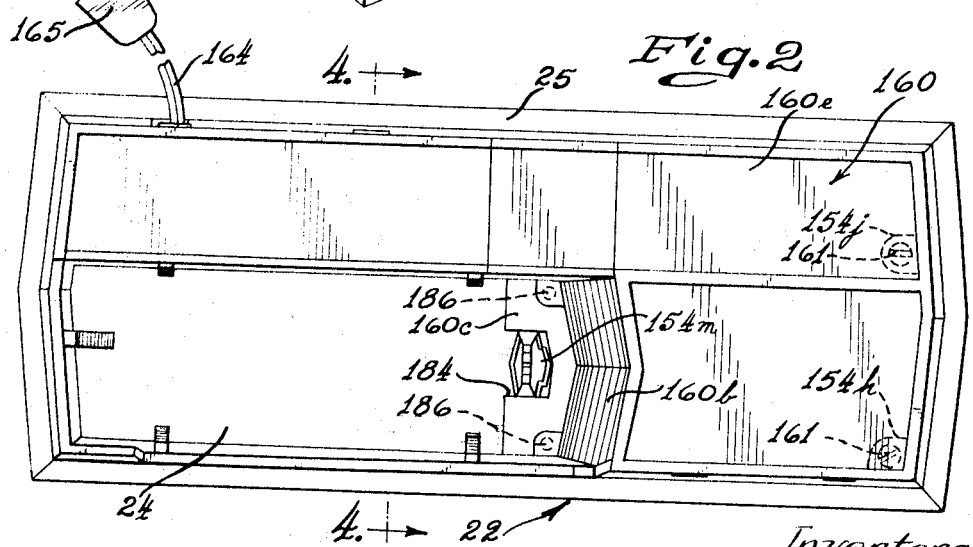
FIG. 2 is a plan view of the charging unit portion of the electric shaving apparatus of FIG. 1 but with its cover removed.
Figure 3:
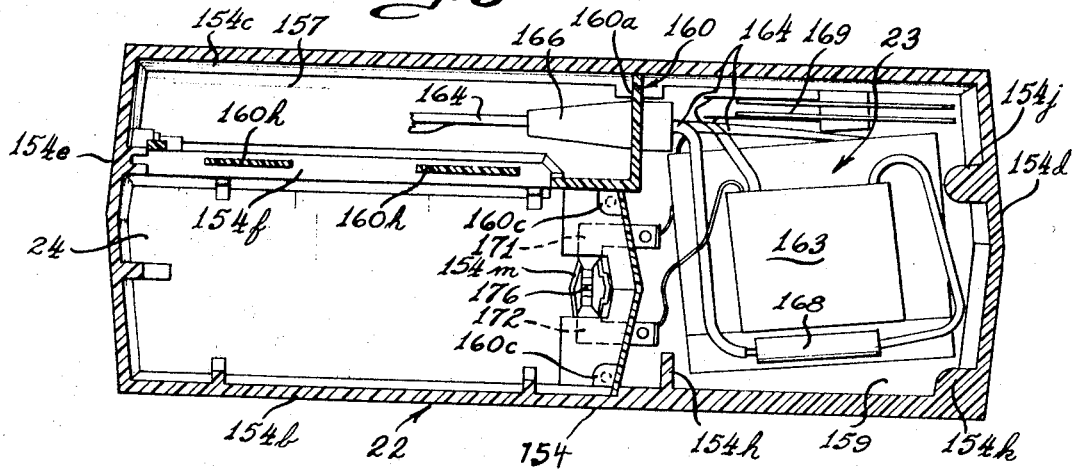
FIG. 3 is a sectional view of the charging unit portion of the electric shaving apparatus of FIG. 1, taken along line 3—3 of FIG. 1.
Figure 4:
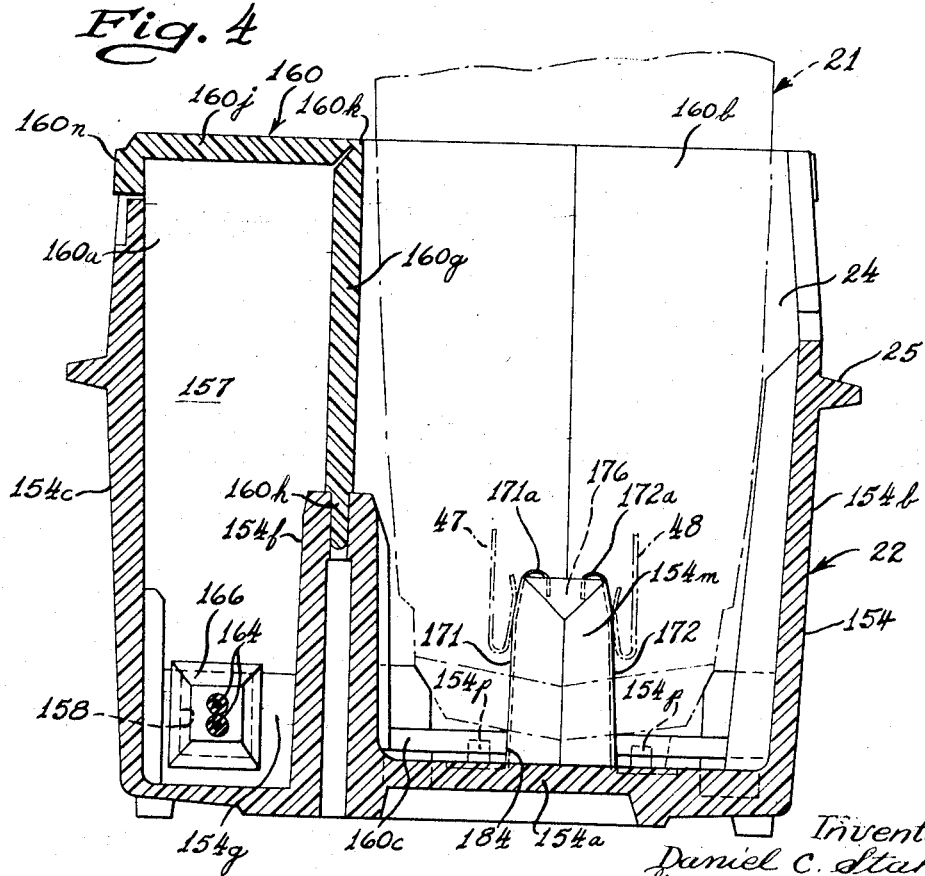
FIG. 4 is a somewhat enlarged sectional view of the support base of the electric shaving aparatus of FIG. 1, taken along line 4—4 of FIG. 2, with the shaving unit shown in phantom.

As was mentioned above, in order that the batteries 41 may be charged and to support and store the shaver 21, there is provided the charging unit 22 including the charging circuit 23, best shown in FIGS. 1, 2, 3, 4 and 6 of the drawings. As therein illustrated, the unit 22 defining the support for the shaver 21 includes a somewhat elongated rectangular boxlike structure 154 molded from a suitable plastic and defined by a bottom wall member 154a (FIG. 4) and a plurality of side and end wall members 154b, 154c, 154d and 154e. The flange defining the shoulder 25 determines the top of wall portion 154d and also the top of a portion of walls 154b and 154c. However, wall portion 154e extends above the flange defining shoulder 25, and a portion of wall portions 154b and 154c extends above this flange, as best shown in FIGS. 1, 2 and 4 of the drawings.

The recess 24 for receiving the shaver 21 in charging unit 22 is defined in part by bottom wall member 154a, end wall member 154e, side wall member 154b, and a longitudinally extending partition member 154f integrally formed with structure 154 and extending upwardly from bottom wall member 154a. As illustrated in FIG. 4 of the drawings, partition member 154f is of double wall construction. Partition member 154f also defines in part a cord storage chamber 157 which is further defined by a low end wall portion 154g (FIGS. 4 and 6) having a plug supporting notch 158 defined therein. The space in boxlike structure 154 to the right of wall portion 154g, as viewed in FIG. 3 of the drawings, is designated by the reference numeral 159 and is a chamber for housing the charging circuit 23 best shown in FIG. 6 and schematically illustrated in FIG. 5 of the drawings. An integral projection 154h (FIG. 3) from wall member 154b defines a support to aid in retaining some of the elements of charging circuit 23 in position. Integral ribs 154j and 154k (FIGS. 2 and 3) extend into chamber 159. These ribs preferably are provided at the top with tapped openings to receive suitable fastening means 161 to hold a cover member generally designated at 160 in position. Effectively then, the boxlike structure 154 defines, in part at least, the recess 24 for receiving the shaving unit 21, the cord storage chamber 157 and the chamber 159 for the charging circuit 23.

Before describing in detail the cover 160 which, as will become apparent from the ensuing description, is somewhat more than a cover, the charging circuit 23 disposed in the chamber 159 will first be described. As illustrated, the charging circuit 23 includes a transformer generally designated as 163 (FIGS. 5 and 6) of known construction including the conventional primary winding 163a and secondary winding 163b. In a device built in accordance with the present invention, the transformer 163, adapted to be connected to a source of standard voltage commonly designated as one hundred ten volts, produced a secondary voltage of the order of 2.8 volts at a charging current of between 0.06 and 0.12 ampere. The primary winding 163a of the transformer 163 is connected to a conventional power cord designated at 164, with the conventional plug-in connector 165 (FIGS. 2 and 5) at one end and a molded strain relief enlargement 166 adjacent the transformer. As illustrated, the strain relief enlargement 166 (FIG. 6) is provided with a groove 167 receivable in the plug supporting notch 158 defined in the low end wall portion 154g. The groove 167 is also adapted to receive a depending wall protion 160a (FIGS. 4 and 6) integrally formed with the cover 160 described in greater detail hereinafter. In this way the strain relief enlargement 166 molded to the power cord 164 is firmly secured in position and this power cord may be disposed in the cord storage compartment 157.

To limit the current in the primary circuit of the transformer 167, a suitable current limiting resistor 168 (FIGS. 3, 5 and 6) is connected in series with the primary winding 163a of the transformer 163. The secondary winding 163b of the transformer 163 has its end terminals connected to one terminal of each of the sections 169a and 169b of a full wave rectifier 169 by conductors 162a and 162b, respectively. One charging terminal 171 is connected to both of the other terminals of rectifier sections 169a and 169b through conductors 170, 170a and 170b, respectively. The central loop of the secondary winding 163b is connected by conductors 173a and 173b to a second charging terminal 172.

Figure 6:
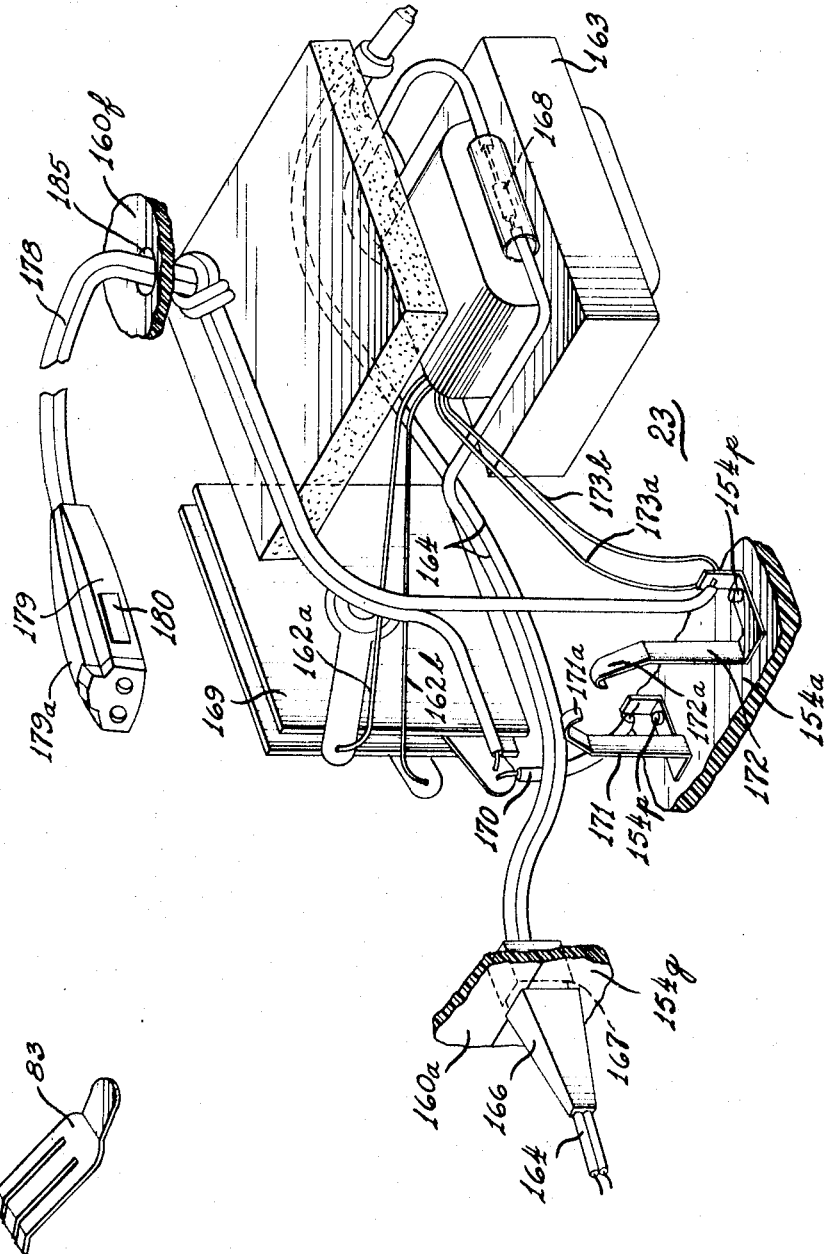
FIG. 6 is an exploded view of the electrical components of the charging unit portion of the electric shaver of FIG. 1.

In order to provide for the charging of the batteries 41a and 41b in the shaving unit 21 upon the mere insertion of the latter into the recess 24, the charging terminals 171 and 172 are of a specific construction best shown in FIGS. 4 and 6 of the drawings so as to readily engage the cooperating terminals 47 and 48, respectively, associated with the shaver 21. To support the charging terminals 171 and 172 there is provided a projection 154m integrally formed with the boxlike structure 154 and projecting upwardly from the bottom 154a into the recess 24 adjacent the end therof near the charging circuit chamber 159. Each of the charging terminals 171 and 172 is of somewhat L-shaped construction with one leg of the L engaging the bottom wall 154a and in fact disposed in a recess in said wall while the other leg of each L extends vertically into recess 24 along opposite edges of the projection 154m and, if desired, disposed within shallow grooves defined along the edges of projection 154m. The end of each leg extending along the projection 154m terminates in a hook-shaped portion designated as 171a and 172a, respectively, each receivable in a suitable opening or recess 176 defined in the top of projection 154m. The projection 154m with the charging terminals 171 and 172 supported thereon is shaped to be received in the bottom opening recess 45 in casing member 32 and is of such width as to insure good contacting engagement between terminals 47 and 171 and terminals 48 and 172, as clearly indicated in FIG. 4 of the drawings, when the shaver 21 is inserted into the recess 24. Suitable integral projections 154p (FIG. 6) extend through openings in the L-shaped charging terminals 171 and 172 to maintain the charging terminals within the recesses provided therefor and in assembled relation with projection 154m with the hook-shaped portions 171a and 172a disposed within the opening or recess 176 in the top of projection 154m.

Figure 5:
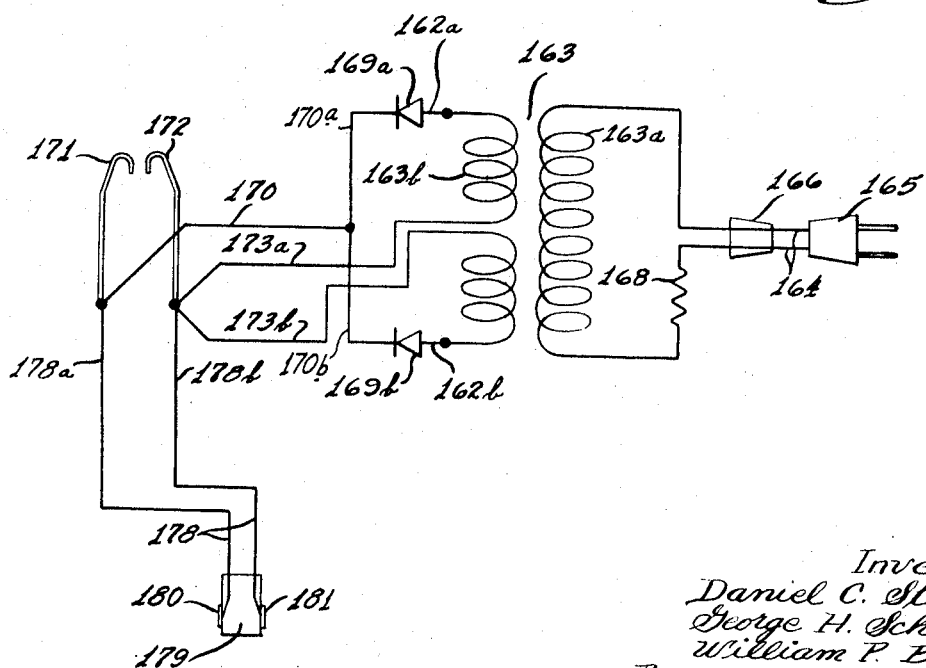
FIG. 5 is a schematic diagram of the electrical circuit of the charging unit portion of the electric shaving apparatus.

In the event the batteries 41a and 41b of shaver 21 were discharged so as to be incapable of operating the motor 40, means are provided for operating the shaver 21 directly from the charging unit 22 without taking the time required to recharge the batteries. To this end, as best shown in FIGS. 5 and 6, the charging terminals 171 and 172 are directly connected to a power cord 178 comprising conductors 178a and 178b including a special polarized plug 179 receivable within the recess 45 of the shaver 21. To this end plug 179 is of generally rectangular cross section with a projecting key 179a along one side receivable within the keyway 50 thus insuring proper polarization. Opposed terminals 180 and 181 on the edges of plug 179 are engageable with the terminal members 47 and 48 to provide electrical contact therewith. With this arrangement it will be apparent that the desired direct current low voltage is supplied directly to the motor 40 of the shaver 21 through the charging circuit 23.

Considering the cover 160 in more detail now, it essentially comprises a plurality of wall portions in addition to the depending wall portion 160a already described. Its purpose is not only to complete the recess 24, the cord storage chamber 157 and the charging circuit chamber 159 but also to define an additional cord storage chamber for storing the cord 178. As illustrated, the cover member 160 includes a depending wall portion 160b having a lateral projection 160c at the lower end thereof which is notched as indicated at 184 to accommodate the projection 154m and the charging terminals 171 and 172. The cover member 160 also includes a boxlike structure 160d immediately to the right of the wall portion 160b as viewed in FIG. 2 of the drawings, which is closed by a suitable cover 160e. The bottom of this boxlike structure is defined by a wall portion 160f, a small portion of which is shown in FIG. 6 of the drawings. This wall portion 160f is provided with a suitable opening 185 through which the cord 178 extends whereby the cord 178 and the plug 179 may be stored within a chamber closed by the cover 160e. A suitable knot in cord 178, as shown in FIG. 6 of the drawings, below wall portion 160f provides the necessary strain relief means. Preferably the hinge for the cover 160e is merely a thinner portion of the plastic material as described hereinafter in connection with another cover portion. It will be understood that the boxlike structure closed by the cover 160e overlies the charging circuit 23 and encloses it so as to be inaccessible to the user under normal conditions when the cover 160 is fastened to the boxlike structure 154 as by suitable fastening means 186 and 161.

To complete the cord storage chamber 157, the cover 160 is provided with additional wall portions including a vertically disposed wall portion 160g which overlies the partition member 154f and is interlocked therewith by suitable projecting tongues 160h (FIG. 4). The cover member 160 also includes a second cover portion 160j which closes the cord storage chamber 157, the hinge for the cover 160j being defined by a thin wall portion 160k best shown in FIG. 4 of the drawings. The covers 160e and 160j are held in closed position by suitable latching means including finger engaging projections 160m in the case of cover 160e (FIG. 1) and 160n in the case of cover 160j (FIG. 4).

It is apparent from the above description that whenever the shaver 21 is disposed in the recess 24 the charging terminals are interengaged, and if the power cord 164 is plugged into a source of alternating current the batteries 41a and 41b will be charged. By virtue of the location of the terminal assembly comprising charging terminals 171 and 172 within the recess 24, the proper polarity is always assured with respect to charging the batteries. In the event the batteries are discharged, the shaver 21 may be directly energized from the power source using the cord 179 as described above.

In view of the detailed description included above, the operation of the charging unit 22 will readily be understood by those skilled in the art. The exterior of the boxlike structure 154 together with the cover member 160 defines a unit of very pleasing appearance whether or not the shaver 21 is associated therewith, and is in the nature of an ornament when reposing on a dressing table, bathroom shelf or the like. Furthermore, it will be apparent that should the batteries be discharged for some reason, such as failure to plug in the charging unit, the user may operate the shaver directly from the alternating source by using the special power cord 178.

While there has been shown and described a particular embodiment of the present invention, it will be apparent to those skilled in the art that various changes and modifications may be made without departing from the invention in its broader aspects and it is, therefore, contemplated in the appended claims to cover all such changes and modifications as fall within the true spirit and scope of the invention.

What is claimed as new and desired to be secured by Letters Patent of the United States is:

1. An electric shaver of the cordless type for use with a power cord and a charging unit having charging terminals, said electric shaver comprising a casing, motor means in said casing, battery means in said casing, a pair of terminals defined in said casing for selectively receiving the charging terminals of the charging unit or receiving the power cord, and electric circuit means including a switch movable between closed and open positions, said switch operative when closed to connect said motor means across both said pair of terminals and said battery means for energization of the motor means either from said battery means or from the power cord, and said switch when open being operative to connect said battery means across said pair of terminals for charging said battery means.

2. An electric shaver as set forth in claim 1 wherein said switch includes an insulating support board, a generally U-shaped switch member secured to said board and having its legs defining movable contact members, a pair of fixed opposed stationary contact members secured to said support board having contact surfaces engageable with respective ones of said moveable contact members, and a rotary switch actuator including a knob portion and a cam extending between said movable contact members for expanding said movable contact members outwardly relative to each other into engagement with said stationary contact members.

3. An electric shaver as set forth in claim 2 wherein said terminal means are mounted on said support board.

4. An electrical apparatus comprising a base defining a support for an electric appliance and including a boxlike structure, partition means in said structure defining a charging compartment, charging means in said compartment adapted to be connected to a source of alternating current electrical energy, wall means closing said charging compartment, a first cord storage chamber defined in said structure, cover means for closing said first cord storage chamber, a second cord storage chamber defined in said structure, cover means for closing said second cord storage chamber, a recess in said structure for receiving a cordless type electric appliance, charging terminals in said recess connected to the output of said charging means, a power cord adapted to be connected to a source of alternating current and connected to the input of said charging means and storable in one of said cord chambers, and a second cord permanently connected to the output of said charging means in common with said charging terminals and adapted to connect to a cordless electric appliance when it is desired to operate the appliance directly from the charging means.

5. An electric apparatus as set forth in claim 4 including a cordless type electric appliance including a casing, motor means in said casing, rechargeable battery means within said casing, means for electrically connecting said motor means to said battery means, and terminal members carried by said casing electrically connected to said battery, said terminal members being engageable with said charging terminals by the mere insertion of said appliance in the recess of said support.

6. An electrical apparatus as set forth in claim 5 wherein said support includes a projection integrally formed with the boxlike structure projecting upwardly from the bottom into said recess and said terminals extend vertically along opposite edges of said projection, and wherein said casing is provided with a recess adapted to receive said projection and position said terminal means in engagement with said terminals, said recess being provided with a keyway, and wherein said second cord is provided with a plug having a key adapted to be received within said recess and provided with terminals electrically engageable with said terminal means.

7. An electric apparatus as set forth in claim 5 wherein said appliance is a cordless type electric shaver.

8. An electrical apparatus comprising a portable electric appliance and a support for said appliance, a recess in said support for receiving and storing said appliance, a charging means mounted on said support having an input adapted to be connected to a source of electrical energy, a first cord adapted to interconnect said input and the source, a pair of charging terminals in said recess coupled to the output of said charging means, a battery means in said appliance, a pair of additional terminals on said appliance engageable with said charging terminals when said appliance is received in said recess, and a second cord having one end permanently connected to the output of said charging means in common with said charging terminals and having another end engageable with said additional terminals on said appliance when said appliance is removed from said recess.

9. The electrical apparatus of claim 8, said appliance comprising a cordless type electric shaver.

UNITED STATES PATENTS
References Cited

| | | | |
|---|---|---|---|
| 3,089,071 | 5/1963 | Hartwig | 320—2 |
| 3,257,600 | 6/1966 | Tolmie | 320—2 |
| 3,329,881 | 7/1967 | Tolmie | 320—2 |
| 3,370,214 | 2/1968 | Aymar | 320—48 X |
| 3,359,635 | 12/1967 | Jepson et al. | 320—2 X |
| 3,386,023 | 5/1968 | Jepson et al. | 320—2 |

JOHN F. COUCH, *Primary Examiner.*

S. WEINBERG, *Assistant Examiner.*

U.S. Cl. X.R.

30—43.9; 200—6; 307—64; 318—139; 320—5